United States Patent
Hasegawa et al.

(10) Patent No.: US 11,279,037 B2
(45) Date of Patent: Mar. 22, 2022

(54) FORCE-SENSE VISUALIZATION APPARATUS, ROBOT, AND FORCE-SENSE VISUALIZATION PROGRAM

(71) Applicants: National University Corporation Nagoya University, Nagoya (JP); Toyota Jidosha Kabushiki Kaisha, Toyota (JP)

(72) Inventors: Yasuhisa Hasegawa, Nagoya (JP); Jun Nakanishi, Nagoya (JP); Shunki Itadera, Nagoya (JP); Jotaro Chiba, Nagoya (JP); Fuminori Saito, Toyota (JP)

(73) Assignees: National University Corporation Nagoya University, Nagoya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 334 days.

(21) Appl. No.: 16/425,039

(22) Filed: May 29, 2019

(65) Prior Publication Data
US 2019/0366548 A1    Dec. 5, 2019

(30) Foreign Application Priority Data
May 31, 2018    (JP) .............................. JP2018-104785

(51) Int. Cl.
G06F 3/048    (2013.01)
B25J 9/16    (2006.01)
G06F 3/01    (2006.01)

(52) U.S. Cl.
CPC ............ *B25J 9/1689* (2013.01); *G06F 3/016* (2013.01)

(58) Field of Classification Search
CPC .... B25J 11/0005; B25J 9/1697; B25J 19/023; B25J 13/003; B25J 9/0003; B25J 9/1664; B25J 9/1666
See application file for complete search history.

(56) References Cited

U.S. PATENT DOCUMENTS 5,855,553 A    1/1999    Tajima et al.
6,126,373 A *  10/2000   Yee .......................... B25J 13/02
                                                             414/5
(Continued)

FOREIGN PATENT DOCUMENTS

EP    3389023 A1    10/2018
JP    H08-132372 A    5/1996
(Continued)

OTHER PUBLICATIONS

WIPO Machine Translation JPWO2017175868A1, translated Jun. 9, 2021 (Year: 2017).*

(Continued)

*Primary Examiner* — Steven B Theriault
(74) *Attorney, Agent, or Firm* — Dinsmore & Shohl LLP

(57) ABSTRACT

A force-sense visualization apparatus includes a data acquisition unit configured to acquire image data and force-sense data, image data being obtained by taking an image of a surrounding environment of a robot, the force-sense data relating to a force sense that the robot has received from the outside, a conversion unit configured to convert the force sense into text information composed of onomatopoeia based on the force-sense data, and an image output unit configured to superimpose the text information on the image of the image data and output the resultant image data.

10 Claims, 7 Drawing Sheets

ONOMATOPOEIA CONVERSION TABLE

| ONOMATOPOEIA | K | $\Delta f$ [N/ms] | $|f_i|$ [N] |
|---|---|---|---|
| THUMP | $0.5 < K$ | $0.07 < \Delta f$ | $|f_i| \leq 3$ |
| CLINK | $0.5 < K$ | $0.03 < \Delta f \leq 0.07$ | $|f_i| \leq 3$ |
| FLUFFY | $0 < K \leq 0.5$ | $0.03 < \Delta f$ | $|f_i| \leq 3$ |
| JERK | — | $\Delta f \leq 0.03$ | $3 < |f_i|$ |

(56) References Cited

U.S. PATENT DOCUMENTS

| | | | |
|---|---|---|---|
| 7,411,576 B2* | 8/2008 | Massie | G06F 1/206 |
| | | | 345/156 |
| 8,538,687 B2* | 9/2013 | Plocher | G01C 21/20 |
| | | | 701/434 |
| 10,319,109 B2* | 6/2019 | Murrish | G06F 3/04815 |
| 10,621,837 B2* | 4/2020 | Tachi | G06F 3/016 |
| 2005/0215171 A1* | 9/2005 | Oonaka | A61B 5/01 |
| | | | 446/301 |
| 2008/0165194 A1* | 7/2008 | Uranaka | G06T 13/20 |
| | | | 345/473 |
| 2009/0257623 A1* | 10/2009 | Tang | G11B 27/034 |
| | | | 382/107 |
| 2010/0076600 A1* | 3/2010 | Cross | H04N 7/15 |
| | | | 700/259 |
| 2013/0016286 A1* | 1/2013 | Nomura | G10L 25/00 |
| | | | 348/578 |
| 2013/0123987 A1* | 5/2013 | Kase | A63H 30/04 |
| | | | 700/259 |
| 2013/0218339 A1* | 8/2013 | Maisonnier | B25J 13/003 |
| | | | 700/257 |
| 2014/0195052 A1 | 7/2014 | Tsusaka et al. | |
| 2016/0232181 A1* | 8/2016 | Masuko | G06F 16/583 |
| 2019/0064927 A1* | 2/2019 | Tachi | G06F 3/03543 |
| 2019/0196663 A1* | 6/2019 | Monastyrshyn | G06K 9/00671 |
| 2019/0265798 A1* | 8/2019 | Nakagawa | H04M 1/7243 |
| 2019/0287285 A1* | 9/2019 | Ishikawa | G06T 11/60 |
| 2019/0307106 A1* | 10/2019 | Hartung | A01K 29/00 |
| 2019/0332119 A1* | 10/2019 | Kim | G06K 9/00805 |
| 2020/0137535 A1* | 4/2020 | Hoffner | G06K 9/00791 |
| 2020/0356176 A1* | 11/2020 | Tachi | G06F 3/011 |

FOREIGN PATENT DOCUMENTS

| | | | | |
|---|---|---|---|---|
| JP | H08-215211 A | 8/1996 | | |
| JP | 2005-510289 A | 4/2005 | | |
| JP | 2015-134384 A | 7/2015 | | |
| JP | 6112300 B2 | 4/2017 | | |
| WO | 03/045264 A1 | 6/2003 | | |
| WO | 2017/099213 A1 | 6/2017 | | |
| WO | WO-2017175867 A1 * | 10/2017 | | G06F 3/01 |
| WO | WO-2017175868 A1 * | 10/2017 | | G06F 3/014 |
| WO | WO-2018110003 A1 * | 6/2018 | | G06F 3/04842 |

OTHER PUBLICATIONS

WIPO Machine Translation WO2017175867A1, translated Jun. 9, 2021 (Year: 2017).*

WIPO Machine Translation W O2018110003AI, translated Jun. 9, 2021 (Year: 2018).*

Ildar Farkhatdinov et al., "A Study on the Role of Force Feedback for Teleoperation of Industrial Overhead Crane", EuroHaptics 2008, LNCS 5024, pp. 796-805, 2008.

Tomo Shiozawa et al., "Prototype of Onomatopoeia Displaying Indoor Environment Perception Support System", IPSJ Interaction 2016, pp. 814-818, Mar. 4, 2016.

Masao Kikkawa, "Onomatopoeia giving tips for exercise", (machine-translated title), Journal of the Society of Biomechanisms 37(4), pp. 215-220, 2013.

Sachi Morimoto, "Study on visual expression using onomatopoeia", Bulletin of JSSD 2017, pp. 492-493, 2017.

* cited by examiner

ONOMATOPOEIA CONVERSION TABLE

| ONOMATOPOEIA | K | Δf [N/ms] | |f_i| [N] |
|---|---|---|---|
| THUMP | 0.5<K | 0.07<Δf | |fi|≤3 |
| CLINK | 0.5<K | 0.03<Δf≤0.07 | |fi|≤3 |
| FLUFFY | 0<K≤0.5 | 0.03<Δf | |fi|≤3 |
| JERK | – | Δf≤0.03 | 3<|fi| |

FORCE-SENSE VISUALIZATION APPARATUS, ROBOT, AND FORCE-SENSE VISUALIZATION PROGRAM

CROSS REFERENCE TO RELATED APPLICATIONS

This application is based upon and claims the benefit of priority from Japanese patent application No. 2018-104785, filed on May 31, 2018, the disclosure of which is incorporated herein in its entirety by reference.

BACKGROUND

The present disclosure relates to a force-sense visualization apparatus, a robot, and a force-sense visualization program.

A technique for performing work by operating a mobile robot in a remote place has been known. Further, a technique for observing a remote place by using images sent from a mobile robot that autonomously moves has been known. A technique for enabling a user in a remote place to have a pseudo experience of a force sense that has been actually received by a mobile robot through a tactile-sense device has also become known (see, for example, Published Japanese Translation of PCT International Publication for Patent Application, No. 2005-510289).

SUMMARY

The present inventors have found the following problem. A tactile-sense device is used, for example, for a purpose such as conveying a force sense received by a robot finger to a fingertip of a user. The place where force senses can be reproduced is limited to a local place and force senses that can be reproduced are also limited. Depending on the use of a robot, it is unnecessary for the user to experience a force sense received by the robot as exactly it is. In some cases, a user who is distant from a robot may want to intuitively and immediately recognize what kind of an external force the robot has received.

The present disclosure provides a technique for enabling a user to intuitively and immediately recognize what kind of an external force a robot that is operating in a remote place has received.

A first exemplary aspect is a force-sense visualization apparatus including: a data acquisition unit configured to acquire image data and force-sense data, image data being obtained by taking an image of a surrounding environment of a robot, the force-sense data relating to a force sense that the robot has received from the outside; a conversion unit configured to convert the force sense into text information composed of onomatopoeia based on the force-sense data; and an image output unit configured to superimpose the text information on the image of the image data and output the resultant image data.

By the above-described configuration, a user can instantly recognize a fact that the robot operating in a remote place has received an external force in the form of visual information that has been superimposed on the surrounding image of the robot. Further, by using the text information composed of onomatopoeia, which is an onomatopoeic word or a mimetic word, as the displayed information, the user can intuitively recognize the nature of the force sense received by the robot.

In the above-described force-sense visualization apparatus, the force-sense data may include information about a place where the robot has received the force sense, and the image output unit may determine a place on the image where the text information is superimposed based on the place information. Since the user can recognize the place where the contact has occurred based on the place of the text information, he/she can easily infer the cause of the contact and the like. Further, the conversion unit may extract conversion information including at least one of a magnitude of the received force, an amount of a change in the force per unit time, and hardness of a contact object from the force-sense data, and changes the onomatopoeia based on the conversion information. The user can intuitively recognize a contact state by the nuance possessed by the onomatopoeia (i.e., the nuance that the onomatopoeia provides to the user).

In the above-described force-sense visualization apparatus, the data acquisition unit may acquire the image data and the force-sense data output from the robot operating in a remote place through a network. By acquiring the data through the network, the place where the robot operates can be significantly expanded. Further, the image output unit may output the image on which the text information is superimposed to a head-mounted display device worn by the user. In particular, a user who remotely operates the robot can have an immersive feeling and improve accuracy of the operation.

Another exemplary aspect is a robot including: an image-pickup unit configured to take an image of a surrounding environment; a detection unit configured to detect a force sense received from the outside; a conversion unit configured to convert the force sense into text information composed of onomatopoeia; and an image output unit configured to superimpose the text information on the image taken by the image-pickup unit and output the resultant image. By configuring the robot so that the robot itself can output the image of the surrounding environment with the text information composed of onomatopoeia superimposed thereon, it is possible to eliminate the need for processes performed by a terminal located on the downstream side and achieve advantageous effects similar to those achieved by the force-sense visualization apparatus according to the first aspect.

Another exemplary aspect is a force-sense visualization program for causing a computer to perform: an image-data acquisition step of acquiring image data obtained by taking an image of a surrounding environment of a robot; a force-sense data acquisition step of acquiring force-sense data relating to a force sense that the robot has received from the outside; a conversion step of converting the force sense into text information composed of onomatopoeia based on the force-sense data; and an image output step of superimposing the text information on the image of the image data and outputting the resultant image data. Advantageous effects similar to those achieved by the force-sense visualization apparatus according to the first aspect can also be achieved even by the computer that executes the above-described program.

According to the present disclosure, it is possible to enable a user to intuitively and immediately recognize what kind of an external force a robot operating in a remote place has received.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Figure 1:
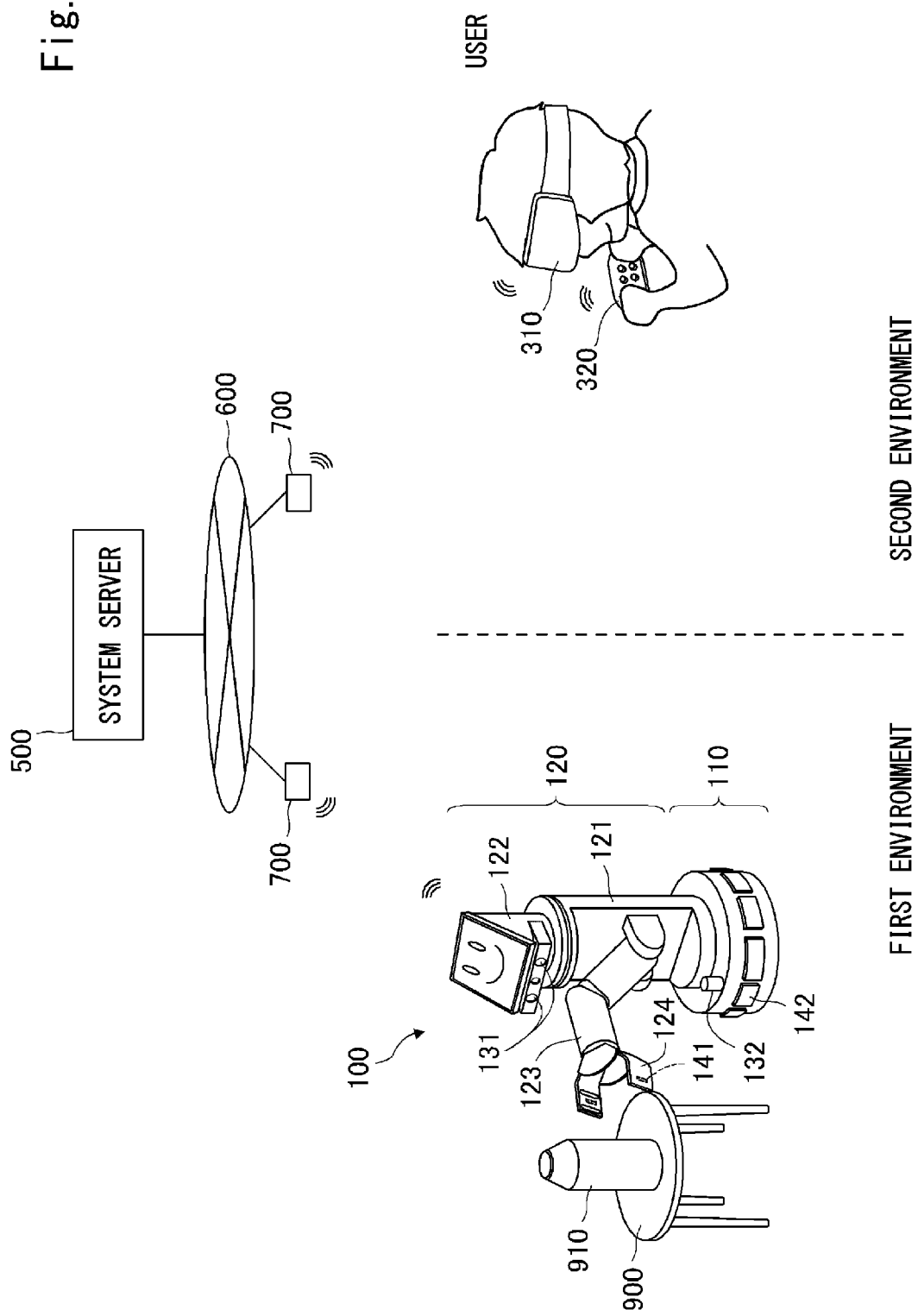
FIG. 1 is a conceptual diagram for explaining an assumed use environment and an overall configuration.

FIG. 1 is a conceptual diagram for explaining an imaginary environment in which a robot remote control system including a built-in force-sense visualization apparatus according to this embodiment is supposed to be used, and its overall configuration. A mobile robot 100 in charge or various operations in a first environment is remotely operated by a user, who is in a second environment distant from the first environment, through a system server 500 connected to an Internet 600. Although the Internet is used as a network to which the system server 500 is connected in this embodiment, the network may be other types of networks such as an intranet.

In the example shown in FIG. 1, a situation in which the mobile robot 100 is performing a task of grasping and conveying an object to be conveyed 910, which is a bottle placed on a table 900 in this example, is shown. The mobile robot 100 includes, mainly, a mobile base part 110 and a main-body part 120.

In the mobile base part 110, a driving wheel(s) and a caster(s) (not shown) are supported inside its cylindrical housing. As the driving wheel is rotationally driven by a motor, the mobile robot 100 can perform a translational movement (i.e., move straight) in an arbitrary direction and turn by an arbitrary angle. The mobile base part 110 includes a laser scanner 132 disposed in a peripheral part on the top surface thereof. The laser scanner 132 scans a certain range on the horizontal plane at intervals of a certain stepping angle and outputs information as to whether or not there is an obstacle in each direction. Further, the mobile base part 110 includes a plurality of contact sensors 142 disposed on the side surface of the cylindrical housing. Each of the contact sensors 142 outputs data on a pressing force when a contact object such as an obstacle comes into contact with that contact sensor. Each of the contact sensors 142 is, for example, a capacitance changing type pressure sensor.

The main-body part 120 includes, mainly, a body part 121 mounted on the top surface of the mobile base part 110, a head 122 placed on the top surface of the body part 121, an arm 123 supported on the side surface of the body part 121, and a hand 124 disposed at the tip of the arm 123. The arm 123 and the hand 124 are driven by motors (not shown) and grasp various objects in a controlled posture. A force sensor 141 is embedded in the hand 124. The force sensor 141 outputs a grasping force by which the hand 124 grasps a grasped object and an external force exerted on the hand 124. The force sensor 141 is, for example, a strain-gauge type force sensor. A plurality of force sensors 141 may be embedded in the hand 124 depending on the shape of the hand 124, the possible object to be grasped, and the like. Alternatively or additionally, force sensors 141 may be embedded in the base of the hand 124 (i.e., the wrist) or the base of the arm 123 (i.e., the shoulder). The force sensor 141 may be other types of sensors such as a capacitance type sensor. Further, force-sense information may be acquired or estimated from a current sensor, an angle sensor, a torque sensor, or the like disposed in each joint of the arm 123, instead of using the force sensor 141.

The head 122 mainly includes a stereo camera 131 as an image-pickup unit. The stereo camera 131 has a configuration in which two camera units having the same angle of view are arranged apart from each other, and outputs images taken by each camera unit in the form of image signals. The head 122 can rotate around a vertical axis (a pan axis) and around a horizontal axis (a tilt axis) with respect to the body part 121 by a driving force(s) of a motor(s) (not shown). Further, the head 122 may be configured to be able to rotate around an axis in a front direction of the stereo camera 131 (i.e., around a roll axis). Therefore, the stereo camera 131 can photograph an object present in an arbitrary direction.

The mobile robot 100 is connected to the Internet 600 through a wireless router 700 in the first environment. The mobile robot 100 receives an operation signal from a user and performs a moving operation and a grasping operation. Further, the mobile robot 100 generates image data conforming to a predetermined image format from the image signal output by the stereo camera 131, and transmits the generated image data to the system server 500. Further, the mobile robot 100 generates force-sense data relating to a force sense from the output signals output from the contact sensor 142 and the force sensor 141, and transmits the generated force-sense data to the system server 500.

The system server 500 receives an operation signal from an operation terminal 320, which the user operates, and transmits the received operation signal to the mobile robot 100. Further, the system server 500 transmits the image data acquired from the mobile robot 100 to a head-mounted display device 310 (hereinafter referred to as an HMD 310) worn by the user. When the system server 500 has acquired force-sense data, it converts a force sense that the mobile robot 100 has received from the outside into text information composed of onomatopoeia, superimposes the obtained text information on the image of the image data, and transmits the resultant image data to the HMD 310 worn by the user.

The operation terminal 320 and the HMD 310 are connected to the Internet 600 through a wireless router 700 in the second environment distant from the first environment. The user remotely operates the mobile robot 100 by operating the operation terminal 320 while observing the image of the sent image data through the HMD 310. An operation signal generated in the operation terminal 320 is transmitted to the system server 500 through the Internet 600. When the mobile robot 100 receives an external force from the surrounding environment, the user can recognize its state by the text information composed of onomatopoeia superimposed on the image of the surrounding environment.

Figure 2:
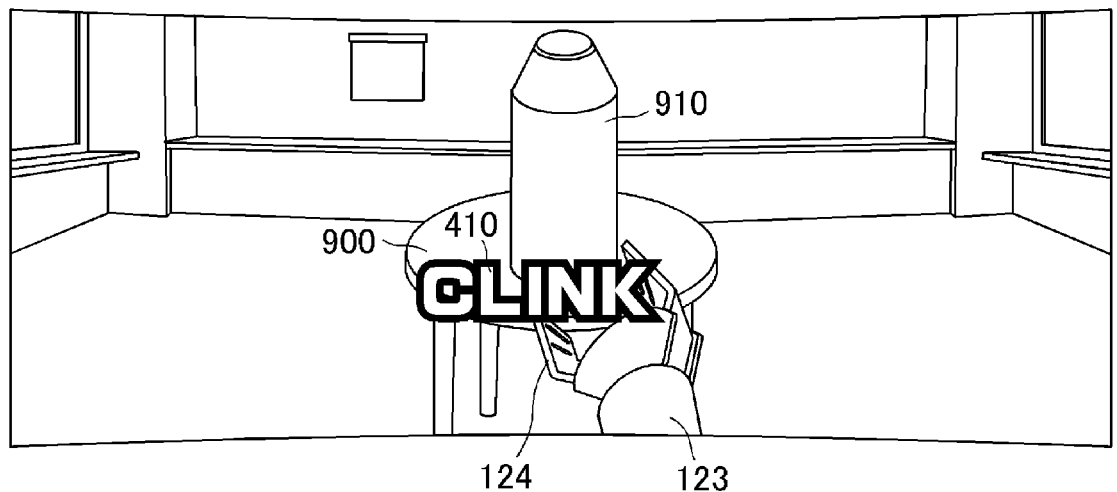
FIG. 2 is an example of an image displayed in a head-mounted display device worn by a user.

It is described hereinafter by using what kind of a display state a user can recognize an external force received by the mobile robot 100. FIG. 2 shows an example of a display screen displayed on the display of the HMD 310 worn by the user. The example shown in FIG. 2, a scene in which the tip of the hand 124 comes into contact with an end of a top board of the table 900 during a process in which the user is moving the arm 123 closer to an object to be conveyed 910

(hereinafter also referred to as the conveyed object 910) by operating the robot 100 by remote control in the state shown in FIG. 1 is shown.

As shown in FIG. 2, a letter string 410 composed of "clink", which is an onomatopoeia, is displayed (i.e., shown) in the vicinity of the contact point between the tip of the hand 124 and the top board of the table 900 while being superimposed on the image of the surrounding environment (hereinafter also referred to as the surrounding image). The user can recognize that the tip of the hand 124 has come into contact with the top board of the table 900 based on this letter string 410. Further, the user can intuitively recognize that the contact was a light collision based on the nuance possessed by the onomatopoeia "clink" (i.e., the nuance that the onomatopoeia "clink" provides to the user).

Figure 3:
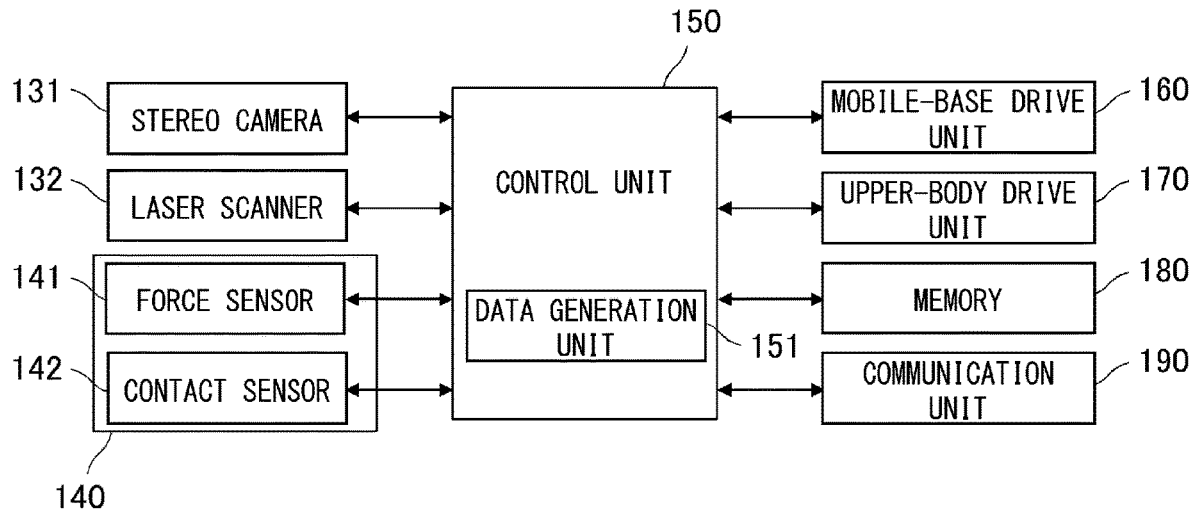
FIG. 3 is a block diagram showing a configuration of a mobile robot.

Next, a configuration of the mobile robot 100 is described. FIG. 3 is a block diagram showing the configuration of the mobile robot 100. Only main components of the robot remote control system relating to visualization of force senses are described hereinafter. However, the mobile robot 100 includes other components and may include additional components that contribute to the visualization of force senses.

A control unit 150 is, for example, a CPU (Central Processing Unit) and is stored, for example, in a control box disposed in the body part 121. A mobile-base drive unit 160 includes a drive circuit and a motor(s) for driving a drive wheel(s). The control unit 150 sends a drive signal to the mobile-base drive unit 160 according to an operation signal, from a user, and thereby controls rotations of the drive wheel(s). An upper-body drive unit 170 includes a driving circuit(s) and motor(s) for driving a grasping part including the arm 123 and the hand 124, the body part 121, and the head 122. The control unit 150 sends a drive signal to the upper-body drive unit 170 according to an operation signal from the user, and thereby performs grasping control and controls rotations of the body part 121 and the head 122. Further, the control unit 150 recognizes current positions of the arm 123 and the hand 124, and orientations of the body part 121 and the head 122 by receiving feedback signals of encoders or the like from the upper-body drive unit 170.

A memory 180 is a nonvolatile storage medium. For example, a solid-state drive is used for the memory 180. The memory 180 stores, in addition to a control program for controlling the mobile robot 100, various parameter values, functions, lookup tables, etc. used for the control.

A communication unit 190 is, for example, a wireless LAN unit and performs radio communication with the wireless router 700. An operation signal generated in the operation terminal 320 is received by the communication unit 190 and delivered to the control unit 150.

A stereo camera 131 takes an image of a surrounding environment according to a request from the control unit 150 and delivers an image signal thereof to the control unit 150. When the remote control is being performed, the stereo camera 131 successively takes imaging of the surrounding environment. A laser scanner 132 detects whether or not there is an obstacle according to a request from the control unit 150, and delivers a detection signal, which is a result of the detection, to the control unit 150.

A force sensor(s) 141 and a contact sensor(s) 142 are sensors that constitute a force-sense detection unit 140. The control unit 150 continuously monitors an output signal from each of the sensors constituting the force-sense detection unit 140. In this embodiment, the force sensor 141 embedded in the hand 124 and the contact sensor 142 disposed on a surface of the cylindrical housing of the mobile base part 110 are shown as examples of the sensors constituting the force-sense detection unit 140. However, the mobile robot 100 may be provided with sensors for detecting external forces at various places thereof where the mobile robot 100 could receive external forces. In particular, various types of force sensors may be disposed on the arm 123 and the hand 124, both of which can be positioned within the angle of view of the stereo camera 131.

The control unit 150 also serves as functional calculation units that perform various operations (or calculations) related to the control and the processing. A data generation unit 151 is one of the functional calculation units. The data generation unit 151 performs image adjustments and compression processing on image signals from the respective camera units, undertook from the stereo camera 131, and thereby generates image data according to a predetermined stereo image format. The generated image data is transmitted to the system server 500 through the communication unit 190. As described above, since the stereo camera 131 successively takes images of the surrounding environment, corresponding image data are successively generated and transmitted to the system server 500.

Further, the data generation unit 151 processes an output signal received from the force-sense detection unit 140 and thereby generates force-sense data conforming to a predetermined data format. The force-sense data includes information about a place of the sensor that has output the output signal. For example, force-sense data generated from an output signal output from the force sensor 141 embedded in the hand 124 includes, as the place information, space coordinates of the place at the time when the signal is output which are calculated from the place where the force sensor 141 is embedded and postures of the arm 123 and the hand 124. The generated force-sense data is transmitted to the system server 500 through the communication unit 190.

Figure 4:
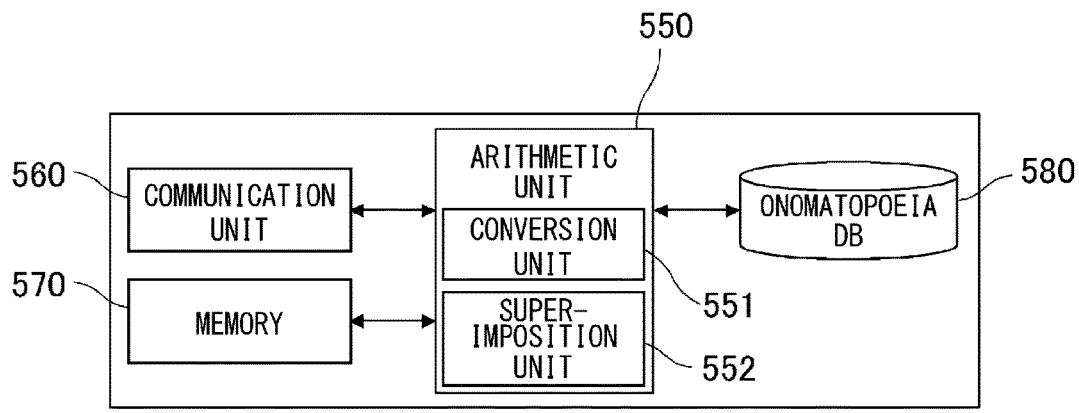
FIG. 4 is a block diagram showing a configuration of a system server.

Next, a configuration of the system server 500, which functions as a force-sense visualization system of the robot remote manipulation system, is described. FIG. 4 is a block diagram showing the configuration of the system server 500. Only main components of the system server 500 relating to visualization of force senses are described hereinafter. However, the system server 500 includes other components and may include additional components that contribute to the visualization of force senses.

An arithmetic unit 550 is, for example, a CPU and performs various processes related to visualization of force senses. A communication unit 560 is, for example, a wired LAN unit, and transmits/receives data to/from the Internet 600. The communication unit 560 receives an operation signal sent from the operation terminal 320 and transmits this operation signal to the mobile robot 100, which is the object to be operated, according to an instruction from the arithmetic unit 550. Further, the communication unit 560 receives image data and force-sense data sent from the mobile robot 100 and delivers them to the arithmetic unit 550. That is, the communication unit 560 has a function as a data acquisition unit that acquires image data and force-sense data.

When the arithmetic unit 550 has acquired force-sense data in addition to image data, it performs later-described processes. In contrast, in a period during which the arithmetic unit 550 is receiving image data alone, it successively transfers the image data to the HMD 310. Note that when the HMD 310 does not support 3D display, the arithmetic unit 550 converts the received image data into an image format for 2D display and then transfers the converted image data to the HMD 310.

A memory 570 is a nonvolatile storage medium. For example, a solid-state drive is used for the memory 570. The memory 570 stores, in addition to a control program for controlling the robot remote control system and a force-sense visualization program for visualizing a force sense that the mobile robot 100 has received from the outside, various parameter values, functions, lookup tables, etc. used for the control and the calculation.

An onomatopoeia DB 580 is a database storing an onomatopoeias conversion table by which a parameter value extracted from force-sense data, which is used an input value, is converted into a specific letter string composed of onomatopoeia. Onomatopoeia is a generic term for onomatopoeic words and mimetic words. The onomatopoeic words are words for imitating sounds uttered by living creatures or produced by non-living objects by using letters. Examples of the onomatopoeic words include "bam", "clunk", and "bang". The mimetic words are words for imitating (i.e., expressing) states or emotions by using letters. Examples of the mimetic words include "tightly" and "strongly". As will be described later in detail, the onomatopoeia conversion table includes a list of a plurality of such onomatopoeic words and mimetic words, and each of the onomatopoeic words and mimetic words is associated with a respective value of each parameter or a respective range of each parameter extracted from force-sense data.

The arithmetic unit 550 also serves as functional calculation units that perform various operations (or calculations) related to the control and the processing. Each of a conversion unit 551 and a superimposition unit 552 is one of the functional calculation units. The conversion unit 551 converts a force sense that the mobile robot 100 has received from the outside into text information composed of onomatopoeia based on acquired force-sense data. As will be described later in detail, the conversion unit 551 calculates a parameter value used for an onomatopoeia conversion from the acquired force-sense data and inputs the calculated parameter value into the onomatopoeia conversion table read from the onomatopoeia DB 580. By doing so, the conversion unit 551 converts the force-sense data into text information composed of onomatopoeia.

The superimposition unit 552 superimposes the text information composed of onomatopoeia obtained by the conversion unit 551 on the image of the acquired image data. The superimposition unit 552 generates image data conforming to a predetermined format from the image on which the text information has been superimposed and outputs the generated image data from the communication unit 560 to the HMD 310. The superimposition unit 552 cooperates with the communication unit 560 and thereby functions as an image output unit that outputs the image data.

Figures 5, 6:
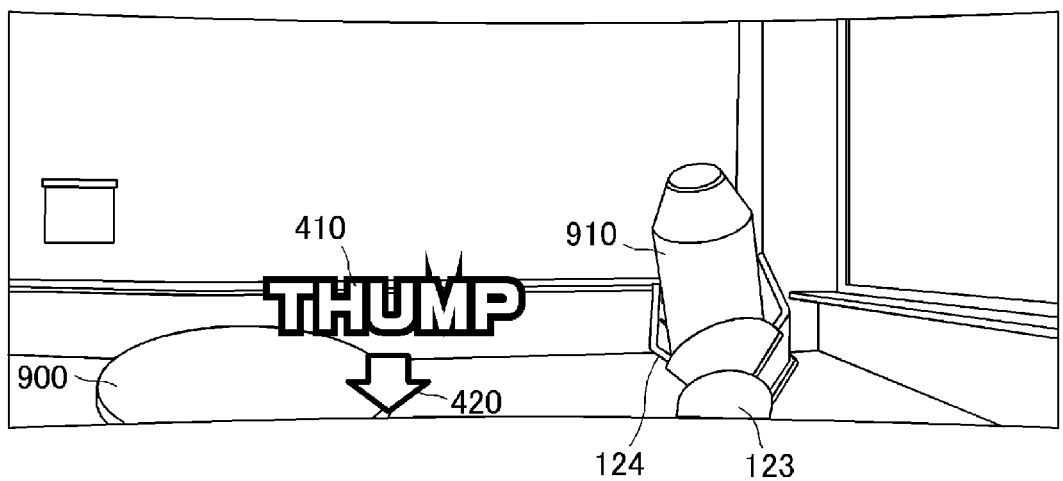
FIG. 5 is an example of an onomatopoeia conversion table.
FIG. 6 is an example of an image displayed in a head-mounted display device worn by a user.

Next, a process for converting a force sense that the mobile robot 100 has received from the outside into text information composed of onomatopoeia, which is performed by the conversion unit 551, is described. FIG. 5 is an example of an onomatopoeia conversion table. For ease of understanding, four examples of onomatopoeias, i.e., "thrust", "fluffy", "clink", and "thump" are described.

Generally speaking, when people see the onomatopoeia "thrust", they imagine a pressed state or a state of feeling a weight of an object. When people see the onomatopoeia "fluffy", they imagine a touch on a soft object. Further, when people see the onomatopoeia "clink" or "thump", they imagine a contact with a hard object. Further, they imagine a light contact in "clink" and imagine a strong collision in "thump". That is, each onomatopoeia has a specific nuance that gives a specific impression to people.

Here, it is assumed that the acquired force-sense data is data generated from the output of the force sensor 141 and includes values of translational forces along three axes. Assuming that a norm of the tri-axial translational force vector (a magnitude of the received force) in i-th sampling is represented by $|f_i|$ and a sampling cycle is represented by $\Delta T$, a variation in the force per unit time, which is represented by $\Delta f$ is expressed as follows.

$$\Delta f = \frac{|f_i| - |f_{i-1}|}{\Delta T} \qquad \text{[Expression 1]}$$

Further, when a norm of the velocity of the force sensor 141, which is obtained by differentiating the position of the force sensor 141, is represented by $|v_i|$, an evaluation value K for evaluating hardness of the object in contact (i.e., hardness of the contact object) is expressed, by using the variation in the force and the velocity, as follows.

$$K = \frac{|f_i| - |f_{i-1}|}{|v_i|\Delta T} = \frac{\Delta f}{|v_i|} \qquad \text{[Expression 2]}$$

In this embodiment, the force sense that the mobile robot 100 has received from the outside is converted into text information composed of onomatopoeia by applying these three parameter values K, $\Delta f$ and $|f_i|$ obtained from the force-sense data into the onomatopoeia conversion table. Referring to the onomatopoeic conversion table shown in FIG. 5, for example, when K=0.7, $\Delta f$=0.05 [N/ms], and $|f_i|$=2.3 [N], "clink" is selected. Therefore, the force sense is converted into text information composed of "clink" which is in the form of text data. Further, when K=0.3, $\Delta f$=0.08 [N/ms], and $|f_i|$=2.1 [N], "fluffy" is selected and the force sense is converted into text information composed of "fluffy". A threshold for each parameter may be experimentally determined so that nuances of onomatopoeias correspond to respective force senses.

Note that an example in which one of four onomatopoeias is selected based on three parameters has been described above. However, parameters used as other types of criteria may be selectively or additionally used. Needless to say, a conversion table may be defined for a large number of other onomatopoeias, so that they may be selected.

Further, when the conversion unit 551 converts, a letter string selected by the onomatopoeia conversion table into text information, the text information may be modified or a form of expression may be specified by using an additional parameter value(s) obtained from the force-sense data. For example, a size, a font, a color, etc. of the letter string may be specified by referring to other parameters when the text information is superimposed.

Figure 7:
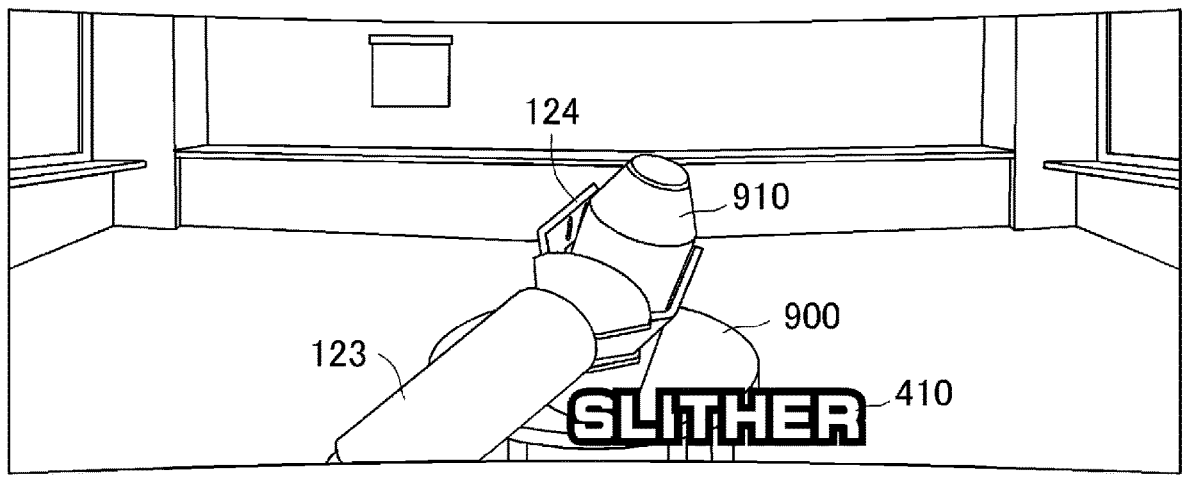
FIG. 7 is an example of an image displayed in a head-mounted display device worn by a user.

Next, a superimposing process for superimposing text information composed onomatopoeia on image of image data is described by using other examples of displayed images as well as the example displayed in the HMD 310 shown in FIG. 2. Similarly to FIG. 2, FIGS. 6 and 7 are examples of imaged displayed in the HMD 310 worn by a user.

In the example shown in FIG. 2, as described above, the letter string "clink" is superimposed in the vicinity of the contact point between the hand 124 and the table 900 on the surrounding image taken by the stereo camera 131. That is, the superimposition unit 552 calculates a corresponding place on the image of the image data from the place information of the sensor included in the force-sense data and superimposes the text information obtained by the conversion unit 551 in the corresponding place.

Specifically, the superimposition unit 552 converts space coordinates, which are the place information of the sensor, into coordinate values in a camera coordinate system of the image data, and determines the corresponding place on the image corresponding to the obtained coordinate values. Further, the superimposition unit 552 applies predetermined decoration to the text data obtained by the onomatopoeic conversion table and thereby generates a letter-string image. When the letter-string information includes decoration information (such as a specified size, a specified font, and a specified color), the letter-string image is generated while referring to this decoration information. Then, the superimposition unit 552 superimposes the generated letter-string image in the calculated corresponding place and thereby generates image data to be output.

When the corresponding place calculated from the place information of the sensor is located within the image area, the superimposition unit 552 can superimpose the text information in the vicinity of the contact point as in the case of the letter string 410 shown in FIG. 2. On the other hand, when the calculated corresponding place is located outside the image area of the acquired image data, the superimposition unit 552 superimposes, for example, a direction mark 420 in the form of an arrow in a peripheral part of the image area close to the corresponding place and superimposes the letter-string image in the vicinity of the direction mark 420 as shown in FIG. 6. Note that in the example shown in FIG. 6, a state in which one of the contact sensors 142 comes into contact with a leg of the table 900 while the mobile robot 100 is changing its orientation (i.e., rotating on its own axis) after the hand 124 grasped the conveyed object 910 is shown. In this case, this contact sensor 142 is not positioned within the angle of view of the stereo camera 131. Therefore, how the contact has occurred is not shown in the image. Even in this case, by superimposing the letter string 410 together with the direction mark 420, the user can intuitively recognize the place where the contact has occurred and the nature of the received force sense.

In the examples shown in FIGS. 2 and 6, the superimposition unit 552 superimposes the letter string 410 in the corresponding place on the image while assuming that the place of the sensor where the mobile robot 100 has received the external force from the outside is the place of the contact with the object. In reality, however, the place of the sensor is not necessarily the place of contact with the object. For example, as shown in FIG. 7, as the grasped conveyed object 910 is dragged on the top board of the table 900, the conveyed object 910 slides on the table 900 while being in contact with the table 900. In this case, even if the letter string 410 is superposed in the place corresponding to the place of the force sensor 141 embedded in the hand 124, it does not agree with the user's intuition.

Therefore, the superimposition unit 552 analyzes a boundary between components that move in conjunction with the movement of the mobile robot 100 and those that move in conjunction with changes of the surrounding environment from the images of the successively acquired image data, and thereby estimates the contact point by referring to distance information at the boundary. Then, the superimposition unit 552 corrects the corresponding place calculated from the place information of the sensor to the estimated contact point. By superimposing the letter string 410 in the corresponding place, which has been corrected as described above, the obtained image agrees with the user's intuition. In the example shown in FIG. 7, the corresponding place is corrected to the contact point between the conveyed object 910 and the table 900. Note that in the example shown in FIG. 7, "slither" having a nuance indicating sliding is selected as the onomatopoeia.

The process for superimposing the letter string 410 composed of onomatopoeia as shown in the examples shown in FIGS. 2, 6 and 7 is performed in response to the acquisition of force-sense data by the system server 500. However, this superimposing process may be continued for a while even after the system server 500 has ceased to acquire the force-sense data. That is, even after the force received from the outside has ceased, the superimposing process may be continued for such a duration that the user can recognize the situation of the contact that has occurred. For example, when an instantaneous collision occurs, the letter string 410 may be superimposed for about 0.5 to 1.0 seconds even after the occurrence of the collision.

Figure 8:
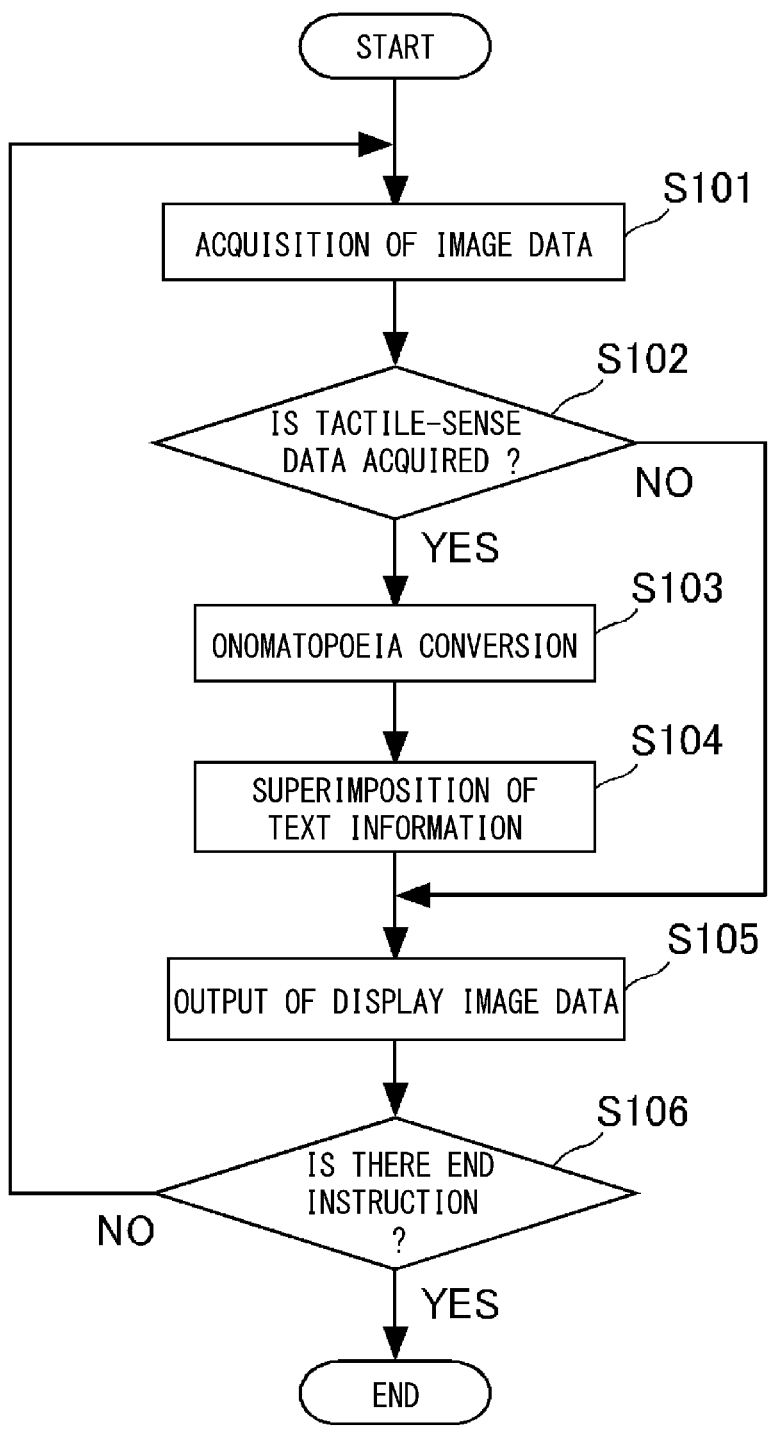
FIG. 8 is a flow diagram of processes performed by a system server.

Next, a series of processes performed by the system server 500, which functions as a force-sense visualization apparatus, is described. FIG. 8 is a flow diagram of processes performed by the system server 500. This flow is started after the robot remote control system is started up.

In a step S101, the arithmetic unit 550 acquires image data from the mobile robot 100 through the communication unit 560. In a next step S102, the arithmetic unit 550 checks whether or not it has also acquired force-sense data. When the arithmetic unit 550 has acquired no force-sense data, the process proceeds to a step S105, in which the arithmetic unit 550 outputs the image data acquired in the step S101 from the communication unit 560 to the HMD 310 as display image data to be displayed in the HMD 310.

When the arithmetic unit 550 has acquired force-sense data, the process proceeds to a step S103, in which the conversion unit 551 converts a force sense that the mobile robot 100 has received from the outside into text information composed of onomatopoeia by using the acquired force-sense data and an onomatopoeia conversion table read from the onomatopoeia DB 580. Next, in a step S104, the superimposition unit 552 superimposes the text information obtained by the conversion unit 551 on the image of the image data acquired in the step S101 and thereby generates display image data. After generating the display image data, the superimposition unit 552 proceeds to a step S105, in which it outputs the display image data from the communication unit 560 to the HMD 310.

In a step S106, the arithmetic unit 550 checks whether or not it has received an instruction for finishing the process (hereinafter referred to as an end instruction) from the user. When the arithmetic unit 550 has not received the end instruction, the process returns to the step S101. When the arithmetic unit 550 has received the end instruction, it finishes the series of processes. Through the above-described processes, the user can visually recognize the surrounding state of the mobile robot 100 as a real-time live moving image through the HMD 310, regardless of whether the text information is superimposed or not.

Figure 9:
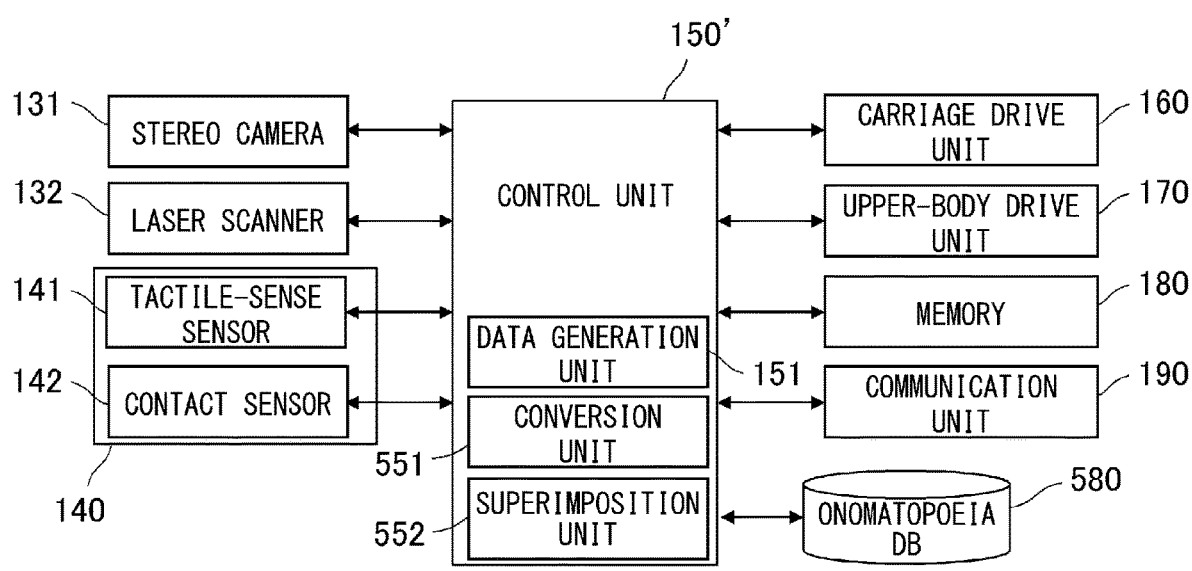
FIG. 9 is a block diagram showing a configuration of a mobile robot according to another embodiment.

In the above-described example, the system server 500 functions as a force-sense visualization system. However, the mobile robot may be configured to include the force-sense visualization apparatus therein. FIG. 9 is a block diagram showing a configuration of a mobile robot 100' according to another example. The mobile robot 100' includes, in addition to all the components shown in FIG. 3, the onomatopoeia DB 580 shown in FIG. 4, and the conversion unit 551 and the superimposition unit 552, which serve as functional calculation units.

According to the mobile robot 100' configured as described above, the conversion unit 551 can calculate each parameter value by directly using the output signal of the force-sense detection unit without using the force-sense data conforming to the predetermined format. Further, the superimposition unit 552 can superimpose the text information by directly using the image signal output from the camera unit. By configuring the mobile robot 100' so that the mobile robot itself can output the image of the surrounding environment with the text information composed of onomatopoeia superimposed thereon as described above, it is possible to eliminate the need for processes performed by a terminal located on the downstream side In the above-described embodiment, the letter string 410 composed of onomatopoeia is superimposed in the vicinity of the place where the contact has presumably occurred. By adjusting the place of the superimposition as described above, the user can recognize the place where the contact has occurred based on the place of the text information, so that he/she can easily infer the cause of the contact and the like. However, instead of adjusting the place of the superimposition, the letter string 410 may be superimposed, for example, at the center of the image area or may be displayed in a display area located outside the image area. Even in such display forms, since the user visually recognizes the surrounding state of the mobile robot 100 as a real-time live moving image, he/she can infer the cause of the contact and the like to some extent. In this case, the force-sense data may not include the information about the place of the sensor.

Further, in this embodiment, an example in which the force-sense visualization apparatus is incorporated in the robot remote control, system for operating the mobile robot 100 from a remote place is described. However, the mobile robot 100 may be a robot that autonomously moves. In this case, a user can observe how the autonomous mobile robot is operating in a remote place through the HMD 310. Further, the present disclosure is not limited to the remote operation and the autonomous operation. That is, the present disclosure may be applied to a stationary work robot such as an arm robot. Further, the present disclosure is not limited to observations from a remote place. For example, an image with text information superimposed thereon may be displayed on a display panel included in a mobile robot 100. By having the mobile robot 100 display images in the mobile robot itself as described above, an attendant who is walking and accompanying the mobile robot 100 can quickly recognize an abnormality in the mobile robot 100.

Further, in this embodiment, the image of the display image data is displayed in the HMD 310 attached to the head of the user. In this way, the user can have an immersive feeling and improve accuracy of the operation of the mobile robot 100 located in a remote place. However, the apparatus that displays the image of the display image data is not limited to the HMD 310. For example, by projecting the image on a large screen, a plurality of users can simultaneously recognize (i.e., simultaneously observe) the state of the mobile robot 100.

Further, in this embodiment, a force sense is converted into text information composed of onomatopoeia. This is because, by doing so, the user can intuitively and instantaneously recognize the nature of the force sense received by the robot as compared to the casa where numerical values, bar graphs, or the like are used. However, numerical values, bar graphs, and the like may be additionally or selectively superimposed as long as they are used in a supplementary manner. Further, in addition to the letter string composed of onomatopoeia, animation and sound effects may be added. For example, a direction of a received force may be expressed by an animated arrow.

Further, the form of the superimposed text information may be changed depending on whether or not the received external force is an external force that is expected to occur as a result of a task performed by the mobile robot 100. When the external force is the expected external force, the superimposing process may not be performed. For example, when the task is a task of grasping an object to be conveyed, the superimposing process may not be performed for the output signal that is output from the force sensor when the mobile robot 100 has grasped the target object to be conveyed. Further, other properties of the superimposed text information, such as the place, the transmittance, and the duration of the superimposition, may be changed according to the situation.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer through a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A force-sense visualization apparatus comprising:
   a data acquisition unit configured to acquire image data and force-sense data, image data being obtained by taking an image of a surrounding environment of a robot, the force-sense data relating to a force sense that the robot has received using a force-sense detection unit, the force sense being generated in response to the force-sense detection unit contacting with a physical object, and the force-sense data including a variation in force per unit time and an evaluation value representing hardness of the physical object;
   a conversion unit configured to convert the force sense into text information composed of onomatopoeia based on the force-sense data and an onomatopoeia conversion table including a list of onomatopoeia and a range of the variation in force per unit time and a range of the evaluation value corresponding to each of the onomatopoeia; and
   an image output unit configured to superimpose the text information on the image of the image data and output resultant image data.

2. The force-sense visualization apparatus according to claim 1, wherein the force-sense data includes information about a place where the robot has received the force sense, and the image output unit determines a place on the image where the text information is superimposed based on the place information.

3. The force-sense visualization apparatus according to claim 1, wherein the conversion unit extracts conversion information including at least one of a magnitude of the received force, an amount of a change in the force per unit time, and hardness of a contact object from the force-sense data, and changes the onomatopoeia based on the conversion information.

4. The force-sense visualization apparatus according to claim 1, wherein the data acquisition unit acquires the image data and the force-sense data output from the robot operating in a remote place through a network.

5. The force-sense visualization apparatus according to claim 1, wherein the image output unit outputs the image on which the text information is superimposed to a head-mounted display device worn by a user.

6. The force-sense visualization apparatus according to claim 1, wherein the evaluation value is determined based on the variation in force per unit time and a norm of a velocity of the force-sense detection unit.

7. A robot comprising:
an image-pickup unit configured to take an image of a surrounding environment;
a detection unit configured to detect force-sense data relating to a force sense generated in response to the detection unit contacting with a physical object, the force-sense data including a variation in force per unit time and an evaluation value representing hardness of the physical object;
a conversion unit configured to convert the force sense into text information composed of onomatopoeia based on the force-sense data and an onomatopoeia conversion table including a list of onomatopoeia and a range of the variation in force per unit time and a range of the evaluation value corresponding to each of the onomatopoeia; and
an image output unit configured to superimpose the text information on the image taken by the image-pickup unit.

8. The robot of claim 7, wherein the evaluation value is determined based on the variation in force per unit time and a norm of a velocity of the detection unit.

9. A non-transitory computer readable medium storing a force-sense visualization program for causing a computer to perform:
an image-data acquisition step of acquiring image data obtained by taking an image of a surrounding environment of a robot;
a force-sense data acquisition step of acquiring force-sense data relating to a force sense that the robot has received using a force-sense detection unit, the force sense being generated in response to the force-sense detection unit contacting with a physical object, and the force-sense data including a variation in force per unit time and an evaluation value representing hardness of the physical object;
a conversion step of converting the force sense into text information composed of onomatopoeia based on the force-sense data and an onomatopoeia conversion table including a list of onomatopoeia and a range of the variation in force per unit time and a range of the evaluation value corresponding to each of the onomatopoeia; and
an image output step of superimposing the text information on the image of the image data and outputting resultant image data.

10. The non-transitory computer readable medium according to claim 9, wherein the evaluation value is determined based on the variation in force per unit time and a norm of a velocity of the force-sense detection unit.

* * * * *